United States Patent

Crowell

[15] 3,679,826

[45] July 25, 1972

[54] SOLID STATE IMAGE SENSING DEVICE

[72] Inventor: Merton Howard Crowell, Morristown, N.J.

[73] Assignee: North American Philips Corporation, New York, N.Y.

[22] Filed: July 6, 1970

[21] Appl. No.: 52,438

[52] U.S. Cl. ....................178/7.1, 340/166

[51] Int. Cl. ....................H04n 5/30

[58] Field of Search....................178/7.1, 6, 7.3 D; 250/211; 340/166

[56] References Cited

UNITED STATES PATENTS

| | | | |
|---|---|---|---|
| 3,435,138 | 3/1969 | Borkan | 178/7.1 |
| 3,536,830 | 10/1970 | Hakki | 178/7.1 X |
| 3,083,262 | 3/1963 | Hanlet | 178/7.1 |
| 3,400,273 | 9/1968 | Horton | 178/7.1 X |
| 3,502,802 | 3/1970 | Osborn et al | 178/7.1 X |
| 3,504,114 | 3/1970 | Irwin et al. | 178/7.1 X |

*Primary Examiner*—Richard Murray
*Attorney*—Frank R. Trifari

[57] ABSTRACT

A solid state imaging device for receiving and storing an optical image is composed of an array of photosensitive diode elements or *p-n* junctions as a first and second region with the further formation of a common collector region. coincident selection of individual storage elements is by virtue of capacitive coupling to row and column lines, and cyclical scanning devices provide a stored charge on the *p-n* junction which is reduced in proportion to the totality of photons incident upon the storage device. Suitable outputs upon recharging are derived from the common collector region. The central or second region is connected to a point of reference potential such as ground for reducing the effect of the capacitive coupling between accessing wires and output leads by virtue of the electrostatic shielding provided by the grounded second region.

4 Claims, 5 Drawing Figures

Figure 1:
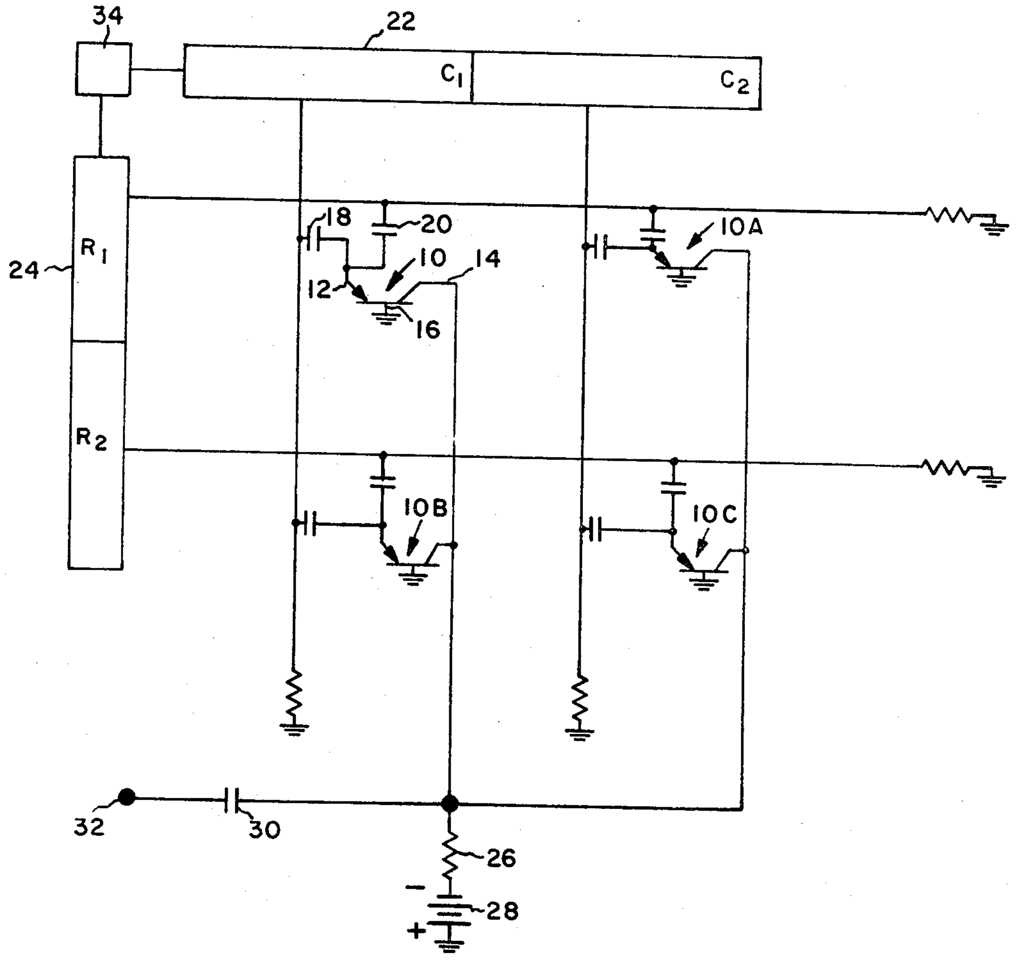

INVENTOR.
MERTON H. CROWELL
BY
AGENT

INVENTOR.
MERTON H. CROWELL
BY
AGENT

INVENTOR.
MERTON H. CROWELL

BY

Frank R. Trifari

AGENT

SOLID STATE IMAGE SENSING DEVICE

This invention relates to solid state imaging devices and particularly to an improved solid state imaging sensing device employing pluralities of electronically sampled arrays of semiconductor storage devices.

Conventional image sensing devices are exemplified in the device known as a vidicon wherein a target area is composed of a suitable photoconductive material placed along a signal plate or transparent conductive coating which in turn forms the inner surface of a glass face through which an image enters. A scanning beam is provided by a thermionic cathode and controlled by means of deflection and focusing coils. A fixed potential, positive with respect to the cathode, is applied to the signal plate. The beam deposits electrons on the inner surface of the photoconductive layer, resulting in the placement of a high charge differential across the photoconductive layer. Since the photoconductive layer has a low natural conduction, only a small quantity of charge will flow across the layer in the absence of incident light. This is the dark current level. When an image is focussed on the target, conductivity of the photoconductive layer increases in the illuminated portion and charge flows across the layer. The electron beam, in striking these areas, will deposit sufficient electrons on the areas to reestablish the original charge, and the current flowing in the external circuit due to this re-establishment produces a signal proportional to the charge deficiency. Where there is no charge depletion, the surface charge repels the beam and a minimal signal is observed. This would correspond to the dark current of the image sensing device.

A subsequent improvement of the foregoing arrangement is to provide a beam scanned target surface composed of an array of electrically isolated reverse-biassed diodes. In this case the information is stored on the electron beam charged diodes in the form of a charge deficiency as a result of light focussed on the diode array, and is read out by the electron beam. Each of the diode junctions exhibit a space charge depletion effect whereby each diode will be discharged to a degree proportional to the number of absorbed photons because the absorbed photons produce hole electron pairs which increase the transfer of charge across the diode junction. Application of the electron beam will restore the original charge. The signal produced during restoration will be proportional to the amount of light, or the number of absorbed photons, originally incident on the diode, subsequent to the previous electron beam application.

The requirements for an image sensing detector include the ability of the device to integrate the total incident light during each frame time. Further, it is desirable that the output signal be linearly proportional to the input light intensity, and thereby maintain the response characteristic gamma factor at unity. In color imaging particularly, it is important that in order to be able to combine light of differing wavelengths and of differing intensities, the target area should respond with a unity or linear gamma characteristic. The sensor must be able to store the radiant information for periods up to a frame time. There should be no distinguishing between photons arriving near the beginning or end of the frame. The detector should also have a minimal cross talk factor, i.e., the diode elements should optimally be electrically isolated from one another.

Systems, employing vacuum tube structure, suffer from such disadvantages as short life and fragility. Further difficulties and disadvantages, such as synchronization, the need for high voltage circuitry and the like are attendant with the use of a beam device for performing the scan function. Elimination of the beam scanning apparatus by an electronic scanning mechanism would have the desirable effect of reducing the overall size of the camera, and the reduction in power circuit requirements normally required for generating cathode heating and deflection currents.

Prior systems employing solid state imaging devices used either diodes or transistors as light sensing elements. A common feature of such devices is to employ a reverse bias on the p-n junction of the diode or transistor, expose the junction to incident light which acts to leak off part of the charge maintaining the reverse bias condition, reapply the reverse bias condition, and measure the extent of the leakage caused by the incident light as a factor proportional to the difference between the level to which the reverse bias has been reduced by the leakage of charge due to the incident light. Each of these arrays include a switching device, such as a diode or blocking capacitor or the floating base of a transistor, placed in series with the light sensing element. The performance of these arrays however, is degraded by the inherent capacitive coupling between the row and column accessing wires and the signal output electrode.

It is therefore a primary object of the present invention to provide a novel and unique electronic image scanner construction which will substantially reduce the effect of the capacitive coupling signal between accessing wires and output electrodes.

It is a further object of this invention to provide a novel and unique electronic image scanner construction which will substantially reduce the effect of the capacitive coupling signal between accessing wires and output electrodes in an integrated body.

The foregoing objects are accomplished in a device having a plurality of storage elements arranged in rows and columns, each of the elements corresponding to the intersection of a suitable row and column conductor. The element is a photosensitive semiconductor device having first and second areas separated by a third area. Means are provided for coupling the row and column conductor to the first area for interrogating the storage element. Means are coupled to the second area for providing an output of the incident illumination stored at the moment of interrogation, and means are provided for coupling the third area to a source of reference potential, thereby improving the isolation between first and second areas by electrostatic shielding. More specifically, scanning means are coupled to each of the row and column conductors for periodically applying a reverse bias to the p-n junction formed by the first and third area. By exposing the device to incident radiation, the reverse bias is reduced to a degree proportional to the totality of photons incident upon the device. The next successive application of reverse bias to the junction formed by the first and third area will provide an output signal indicative of the magnitude of said reduced reverse bias levels, thereby providing an indication of the incident light during the period between applications of reverse bias.

Figure 2:
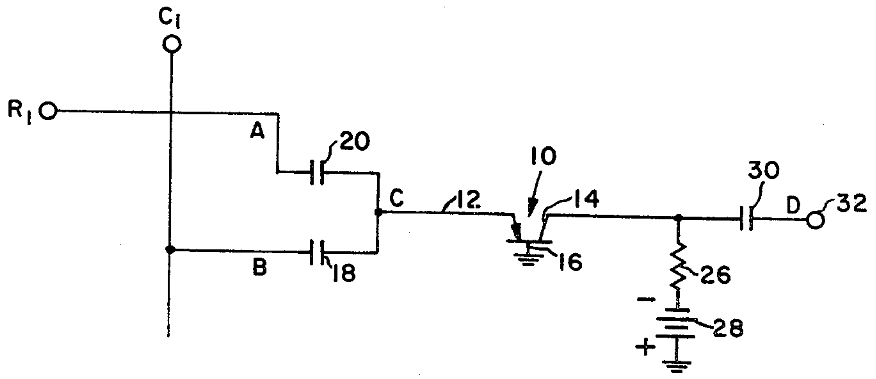
Figure 3:
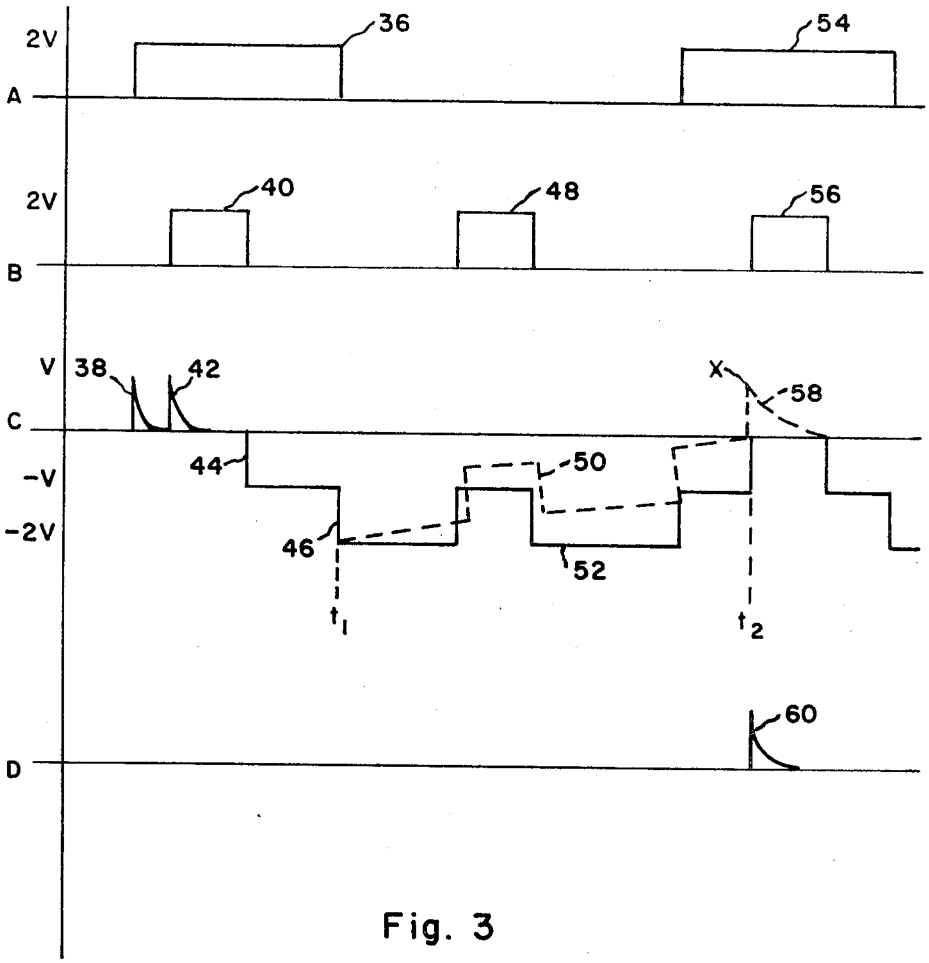
Figure 4:
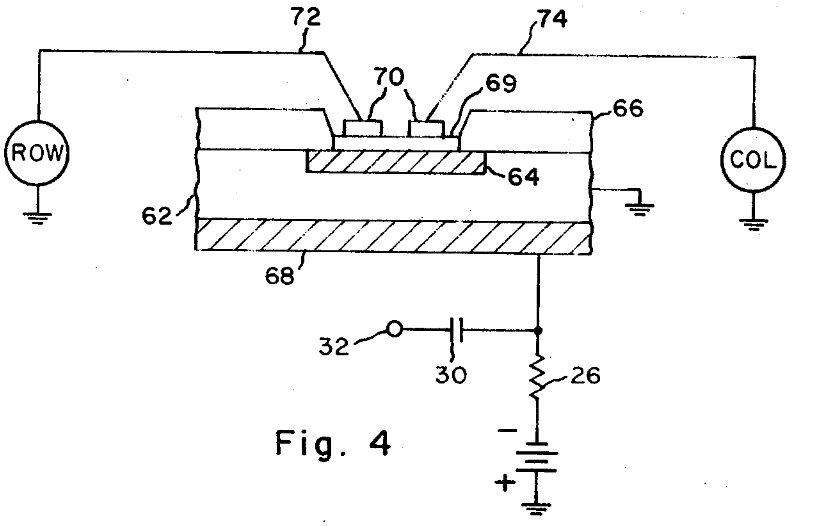
Figure 5:
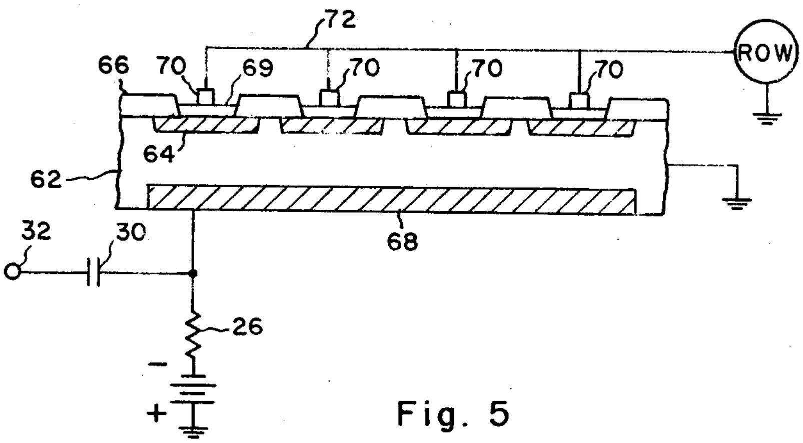

The foregoing description and objects as well as further objects and advantages of the present invention become more apparent when considered in view of the following detailed description and drawings, wherein:

FIG. 1 is a schematic illustration of an array incorporating the arrangement of the present invention, FIG. 2 is a schematic illustration of one of the storage devices of the present invention, FIG. 3 is a waveform diagram describing the operation of the element of FIG. 2, FIG. 4 is a view of the solid state construction of one of the storage devices of the present invention, and FIG. 5 is a further view of the embodiment shown in FIG. 4.

Referring to FIG. 1, a two by two array is illustrated in a matrix arrangement of storage elements, each consisting of a photosensitive semi-conductor transistor type device 10 having emitter electrode 12, collector electrode 14 and base electrode 16. As illustrated, the emitter electrode is coupled to accessing wires, in the form of a row and column line, through a capacitor 18 and 20. Column lines are connected to a column scanning pulse distributor 22 which has shown in this embodiment comprises two sequential stages C1 and C2 each coupled to a respective column line. The row conductors are coupled to a row scanning pulse distributor 24 shown as having two sequential stages R1 and R2 each respectively coupled to a row line. The base electrode 16 of each of the storage elements 10 is shown as connected to a point of reference potential, in this example, ground. The output collector electrode 14 is commonly connected with the other collector electrodes to an output, the load resistance 26 and a source of potential 28, and the output is derived therefrom through a suitable capacitor 30 to an output terminal 32. The row and column lines each may be terminated in suitable impedances as illustrated.

Referring to FIG. 2, wherein like numerals relative to FIG. 1 are employed to indicate like elements, the operation of each of the storage devices is illustrated. Each of the storage elements 10 are designed to operate on a coincidence selection basis. The distributors 22 and 24 are designed to operate cyclically under the control of a pulse unit 34 such that, for example in the array of FIG. 1, a row pulse generated by the stage R1 will be applied to the corresponding row line and applied to the elements 10 and 10A coupled thereto. During the first point in time and coincident with the application of the row pulse from stage R1, a column pulse from the stage C1 of the column pulse distributor 22 will be applied along the column on the column line to the elements 10 and 10B. Selection, to be described further below, is effective in element 10 since this element is the only element receiving a coincidence of both row and column pulses. The column pulse is of short duration relative to the row pulse, and after the termination of the column pulse from C1 a second column pulse from the stage C2 is propagated along the corresponding column pulse line to the elements 10A and 10C. Since the row line pulse from R1 is still active, elements 10A will be selected. At this point the pulses from both stages R1 and C2 terminate, and the next successive row pulse beginning with the stage R2 and the corresponding row line is applied. The sequence of the column pulse generation begins again. Thus, the elements are scanned in the order 10, 10A, 10B, and 10C. The cycle then begins again with element 10. It is understood that in an actual array, a matrix of many hundreds of thousands of elements can be employed to the density desired and to the resolution required. The underlying concept however remains as illustrated in connection with FIG. 1.

Referring again to FIG. 2, and to FIG. 3, the row pulse 36 generated by the stage R1 of the row pulse distributor 24 appears at the point A. For purposes of illustration it will be assumed that the voltage pulse has a magnitude of plus 2V. The appearance of the row pulse at point A causes a voltage spike 38 to appear on the other side of the capacitor at point C as illustrated in FIG. 3. The appearance of the column pulse 40 coincident with the row pulse again causes a voltage spike 42 to appear at the point C through the capacitor 18. The subsequent termination of column pulse 40 causes the capacitor 18 to discharge and the point C approaches the potential level of minus V. It is recognized that there is a capacitive effect through the transistor junction, however, this effect is minimal and will be ignored for purposes of this example. Subsequent discharge of the column pulse 36 will cause the storage charge on capacitor 20 to discharge and the point C approaches the potential level of minus 2V. This minus 2V potential level appearing at the emitter electrode 12 ensures a reverse bias condition of minus 2V at the emitter electrode 12 with respect to the grounded base electrode 16. The minus 2V condition once established prepares the storage device 10 for the receipt of the incident illumination.

It is noted that reverse biasing of the *p-n* junction formed by the emitter 12-base 16 contact will remain in such reverse biased condition and therefore nonconducting as long as the potential at point C remains negative. When the reverse bias potential becomes positive a current flow through the transistor will result in an output appearing through the capacitor 30 at the output terminal 32. The resistance 26 insures a limitation of the current flow at the conduction, and the bias 28 ensures rapid switching of the transistor when the forward bias condition appears. The appearance of a subsequent column pulse at point B without the presence of a coincident row pulse at point A will result in the potential level at point C proceeding from minus 2V to minus V. Since the potential level does not cross zero, no conduction of the transistor emitter-base junction takes place, and no output at the point D is evident. Removal of the non coincident column pulse again returns the bias condition of point C to minus 2V. During this period of nonselection however the storage device 10 is subject to incident illumination. Illumination of the storage device 10 during the period between coincident application of pulses results in the charge at the point C, relative to ground, decreasing by a degree proportional to the number of incident photons, since the photons produce free electron hole pairs which are separated by the reverse bias and drawn to the respective electrodes. The total charge thus removed at any instant of time is proportional to the totality or the integral illumination received during the time elapsed since the previous sampling pulse. The integration time available for each element corresponds to the frame time, which, in conventional television, may amount to one-thirtieth of a second. The integration feature of this device thus provides a sensitivity corresponding to comparable conventional television image storage systems.

As shown in FIG. 3, the reduction of charged level at point C with respect to ground is illustrated as a dashed line 50 to show its relationship to the solid line 52 representing the charge stage at point C without the effect of incident illumination. Illumination is assumed from points t1 and t2 to be constant, and therefore the charge level is shown rising at a constant rate indicative of the integrating effect of the storage device 10. Charge leakage is assumed to be almost maximum and thus the dashed line 50 is shown rising to a point X or almost equivalent to +V. At the next successive appearance of the coincident column and row pulses 54 and 56 at the selected element, the switching of the charge at point C by a magnitude of +2V results in the dashed segment 50 exceeding zero by an amount previsely proportional to the reduction of charge due to the leakage caused by incident light. At this point the *p-n* junction formed by electrodes 12, 16 of the storage device 10 are rendered forward conducting, and a current flow imediately appears through the resistance 26 and the capacitor 30 to form an output at point 32 which will have a magnitude proportional to the integral of the incident light received during the time *t*1, *t*2. The storage device 10 after conduction immediately begins to approach a steady state condition and the time constants of the circuit are designed to insure that steady state conditions are achieved prior to the termination of the pulse. Thus, termination of row and column pulses 54 and 56 will result in resetting the point C at a minus 2V potential thereby again establishing the reverse bias condition and allowing the next frame time cycle to begin. It should be noted that the forward bias of a *p-n* junction represented by the peak of the curve 58 is in an amount related to the total charge on the *p*-region which is integrated during the time *t*1, *t*2 between interrogation periods. This forward bias will inject minority carriers into the *n*-type base. Via normal transistor action, these holes will diffuse to the collector region. The amount of charge which flows by the actual transport of charge while the *p-n* junction is forward biased will be exactly equal to the integrated charge which crossed the p-n junction during the integration period.

In addition to the current due to charge movement across the junction, a displacement current due to capacitive coupling is also present. The grounded base region provides a shunt to ground for such displacement current, thereby substantially reducing the signal due to capacitive coupling. This electrostatic shielding provided by the grounded base region between accessing wires and output lead is the major advantage of this invention. The output signal results from the minority carriers which are injected from the *p-n* photo diode and collected by the large *p*-type collector region. When these carriers cross the *p-n* junction and recombine to the p-type region they produce a signal voltage across the load resistor 26 which is carried through the capacitor 30 of the output terminal 32 as described above.

Referring to FIG. 4, the physical construction of the storage device 10 is illustrated. It is noted that the capacitor units 18 and 20 are integratable along with the storage unit 10 by conventional integral techniques. Thus, FIG. 4 shows a storage device 10 constructed of a common substrate region 62 of *n*-type semiconductor material into which a further region of *p*-type material 64 is diffused through holes in a suitable surface insulating layer 66 of a material such as silicon dioxide. At the same time, a common *p*-type collector region 68 is formed on the opposite side of the substrate. Thus, the single diffusion forms a multitude of transistors having common bases and collectors. The next step in the manufacture of this device consists in the creation of a thin silicon dioxide layer 69 over each of the *p*-type regions which form the diode. Electrodes 70 contact the thin layer of silicon dioxide 69 and via conductors 72 and 74 respectively connect to the row and column pulse distributors. The outputs are commonly derived through resistor 26 from a common collector region 68. Conventional multi-layered technology may be used to provide the row-column accessing wires 72 and 74 in the form of elongated conducting connection forming plural crossings and forming part of the device structure and which connect to the capacitors formed between the electrodes 70 and the p-type material 64. It is noted the assembly technique shown in FIGS. 4 and 5 result in two capacitors connected to each *p*-type region, each of the capacitors respectively connected through the lines 72 and 74 to the scanning row and column pulse generators, as shown schematically in FIG. 2. FIG. 5 which shows FIG. 4 from a cross-sectional view illustrates the common connection of the row conductor 72, the column conductor being omitted for purposes of clarity.

The position of the ground point on the substrate 62, a shown schematically in FIG. 5, would ordinarily result in a distributed impedance effect along the length of the substrate 62 away from the grounded point. This would be expected to create a substantial reduction in shielding effects as additional column lines are added. However, it has been found that the noise level does not increase with the addition of column lines, due to the shunt effect caused by the low impedance termination of non-selected column lines. Thus, each pulse appearing at a selected *p-n* junction is a.c. coupled through adjoining *p-n* junctions to low impedance terminations which form an impedance effectively connected in parallel with whatever distributed impedance is present at the selected *p-n* junction relative to ground. If necessary, additional d.c. grounding points can be provided by etching through the surface oxide layer 66 to the substrate 62 between the *p*-islands 64 and providing a ground connection thereto.

It should be understood that the pulse application may be affected by means of other suitable devices. The desired pulse generation pattern can be derived from tapped delay line structures or by known digital techniques such as by binary counters, circuits employing flip-flops with multi-terminal decoding gates, or single row of monostable multi-vibrators arranged to be mutually triggering. As a means of further integrating the device the row and column pulse-scanning mechanisms may be incorporated directly onto the solid state device illustrated in FIGS. 4 and 5 by conventional diffusion of multilayering integrated techniques. Further, by proper altering of potentials and polarities, the polarity of the semiconductor materials can be reversed as will be evident to one skilled in the art. Materials noted above are exemplary and other equivalent materials can be substituted therefor.

Although certain embodiments and descriptions have been provided, it is to be understood that various further modifications, omissions and refinements which depart from the disclosed embodiments may be adopted without departing from the spirit or scope of the invention.

What is claimed is:

1. A storage device for incident illumination comprising a plurality of storage elements arranged in row and columns, a plurality of row and column conductors, each of said elements corresponding to the intersection of a row and column conductor, said elements including a photosensitive semiconductor device having first and second semi-conductor regions separated by a third semi-conductor region, accessing means coupling a row and column conductor to said first semi-conductor region for interrogating said storage element, means coupled to said second semi-conductor region for providing an output indicative of the total illumination incident upon said storage element between successive interrogations, and means coupling said third semi-conductor region to a source of reference potential thereby shielding said accessing means from said output.

2. The combination of claim 1 including a first multi-stage pulse distributor, each stage thereof coupled to a respective column line, a second multi-stage pulse distributor, each stage thereof coupled to a row line, means coupled to each of said distributors for providing a column scan pulse sequence and a row scan pulse sequence permitting each of said storage elements to be sequentially scanned by coincident application of row and column pulses once every frame time.

3. A device for storing and receiving incident illumination comprising a plurality of storage elements arranged in rows and columns, a plurality of row and column conductors, each of said storage elements corresponding to respective intersections of said row and column conductors, each said storage element having first and second *p-n* junctions defined by first, second and third semi-conductor regions, said third semi-conductor region separating said first and second regions, means connecting said third region to a point of reference potential, means coupling said row and column conductors to said first region, scanning means coupled to each of said row and column for periodically applying a first bias to successive ones of said *p-n* junction, said ones of said *p-n* junctions responsive to illumination incident upon said storage device for reducing said reverse bias level to a degree proportional to the photon quantity of said incident illumination, and means coupled to said second region and responsive to the next successive reapplication of said reverse bias for providing an output signal indicative of the magnitude of said reduced reverse bias level.

4. A device for storing and receiving incident illumination comprising a plurality of storage elements arranged in rows and columns, a plurality of row and column conductors, each of storage elements corresponding to respective intersections of said row and column conductors, said storage elements comprising a plurality of semi-conductor elements of a first conductivity type arrayed on one side of a common substrate of a second conductivity type to form a first plurality of *p-n* junctions, first and second groups of elongated conducting connections forming plural crossings, each *p-n* junction including a surface layer of insulating material thereon thereby forming a capacitive coupling to said *p-n* junction, a conductor from each of said first and second groups conductively coupled to said layer of insulating material, a further region material of said first conductivity type formed on the other side of said common substrate to form a further *p-n* junction, said further *p-n* junction common to all of said first plurality of p-n junctions, means connecting said common substrate to a point of reference potential, said row and column conductors corresponding to said first and second group of conductors respectively, scanning means coupled to each of said row and column conductors for periodically applying a reverse bias to each of said first plurality of *p-n* junctions, each of said first plurality of *p-n* junctions thereafter responsive to illumination incident thereon for reducing said reverse bias level to a degree proportional to the photon quantity of said incident illumination, and means coupled to said further region of material of said first conductivity type and responsive to the next successive application of said reverse bias for providing an output indicative of the magnitude of said reduced reverse bias level.

* * * * *